(12) United States Patent
Shamoto et al.

(10) Patent No.: US 6,687,442 B2
(45) Date of Patent: Feb. 3, 2004

(54) OPTICAL FIBER FOR PRESERVING PLANE OF POLARIZATION

(75) Inventors: Naoki Shamoto, Sakura (JP); Kuniharu Himeno, Sakura (JP); Akira Wada, Sakura (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 10/047,669

(22) Filed: Jan. 14, 2002

(65) Prior Publication Data
US 2002/0131738 A1 Sep. 19, 2002

(30) Foreign Application Priority Data
Jan. 17, 2001 (JP) .......................... 2001-009488

(51) Int. Cl.[7] .............. G02B 6/02; G02B 6/16; G02B 6/22
(52) U.S. Cl. .................. 385/123; 385/125; 385/127
(58) Field of Search ................... 385/123–129

(56) References Cited

U.S. PATENT DOCUMENTS

| 4,664,473 A | * | 5/1987 | Gannon ........................ 385/126 |
| 4,913,521 A | * | 4/1990 | Tajima et al. ................ 385/126 |

FOREIGN PATENT DOCUMENTS

| EP | 0 484 659 A3 | 5/1992 |
| JP | 61-215225 | 9/1986 |
| JP | 63-206710 | 8/1988 |
| JP | 01-222208 | 9/1989 |
| JP | 1-237507 | 9/1989 |
| JP | 1-257149 | 10/1989 |
| JP | 01257149 A | * 10/1989 | ......... C03B/37/012 |
| JP | 08-101323 | 4/1996 |
| JP | 8-101323 | 4/1996 |

OTHER PUBLICATIONS

Kikuchi, Y., "Characteristics of Long Length and Low–Loss Polarization Maintaining Optical Fibers," 12th European Conference on Optical Communication (ECOC) Barcelona, Sep. 22–25, 1986, pp. 235–238.

* cited by examiner

Primary Examiner—John D. Lee
Assistant Examiner—Tina M Lin
(74) Attorney, Agent, or Firm—Bell, Boyd & Lloyd LLC

(57) ABSTRACT

An optical fiber for preserving the plane of polarization including a cladding and a stress imparting part disposed in the cladding, the stress imparting part comprising a base material including $B_2O_3$. The average concentration of $B_2O_3$ in the base material of the stress imparting part is in a range between about 17 and 21 wt. %, and the maximum concentration of $B_2O_3$ in the base material is in a range between about 17 and 22 wt. %. The optical fiber has excellent polarization plane preserving properties, and no concave portion is generated in its stress imparting part even under wet heat conditions.

2 Claims, 1 Drawing Sheet

OPTICAL FIBER FOR PRESERVING PLANE OF POLARIZATION

BACKGROUND OF THE INVENTION

1. Field of the Invention

The present invention relates to an optical fiber for preserving the plane of polarization. More specifically, the present invention relates to a stress imparting type optical fiber for preserving the plane of polarization which may be used for optical communication or optical sensors and has an excellent plane of polarization preserving property even under wet heat conditions.

2. Background Art

There are various types of optical fibers for preserving plane of polarization (hereinafter also referred to as polarization plane preserving optical fibers) in which the stress distribution in a single mode optical fiber is anisotropic, and particularly, one having a stress imparting part in its cladding has been widely used. The stress imparting type polarization plane preserving optical fibers may be categorized as the PANDA type, the bow tie type, the oval jacket type, etc., based on their shapes. Among these the PANDA type polarization plane preserving optical fiber is particularly widely used because of its large double refractive index and excellent polarization plane preservability.

FIG. 1 is a diagram showing an example of a conventional PANDA type polarization plane preserving optical fiber. In FIG. 1, the PANDA type polarization plane preserving optical fiber 4 includes a core 1 having a large refractive index, a cladding 2 which is formed around the core 1 so as to be concentric with the core, and stress imparting parts 3 which are disposed in the cladding 2. The stress imparting parts 3 are placed symmetrically with respect to each other with respect to the core 1 in the cladding 2. Each of the stress imparting parts 3 has a circular cross-section and its refractive index is lower than that of the cladding 2.

The stress imparting part 3 is made by using a material having a thermal expansion coefficient larger than that of a material used for forming the cladding 2. In particular, a $B_2O_3$—$SiO_2$ glass is widely used for the stress imparting part 3. Since the thermal expansion coefficient of $B_2O_3$ is larger than that of $SiO_2$, the stress applied to the core 1 increases as the proportion or the concentration of $B_2O_3$ increases, and accordingly, the double refractive index thereof is increased.

Japanese Unexamined Patent Application, First Publication (Kokai), No. Hei 8-101323, for example, discloses a polarization plane preserving optical fiber having a stress imparting part whose $B_2O_3$ concentration increases toward its center. Accordingly, the distribution of $B_2O_3$ in the stress imparting part of the polarization plane preserving optical fiber spreads out from its center toward the outer periphery portion thereof. In the above publication, it is also disclosed that the $B_2O_3$ concentration at the peripheral portion of the stress imparting part is preferably 15 wt. % or less so that the thermal expansion coefficient of the stress imparting part 3 becomes closer to that of the cladding 2. In this manner, the concentration of stress at the interface between the two may be eliminated and the generation of cracks may be prevented.

However, if the concentration of $B_2O_3$ at the center of the stress imparting part is high as in the polarization plane preserving optical fiber disclosed in the Japanese Unexamined Patent Application, First Publication, No. Hei 8-101323, the-stress imparting part may be dissolved under wet heat environmental conditions since $B_2O_3$ is deliquescent. Accordingly, a concave portion may be generated in the stress imparting part. If a concave portion is generated in the stress imparting part, the polarization plane preserving property of the optical fiber is deteriorated and a polarization crosstalk may be induced.

SUMMARY OF THE INVENTION

An object of the present invention is to provide a polarization plane preserving optical fiber having an excellent polarization plane preserving property in which no concave portion is generated in its stress imparting part even under wet heat conditions.

The above object may be achieved by an optical fiber for preserving plane of polarization including a cladding and a stress imparting part disposed in the cladding, the stress imparting part comprising a base material including $B_2O_3$. The average concentration of $B_2O_3$ in the base material of the stress imparting part is in a range between about 17 and 21 wt. %, and the maximum concentration of $B_2O_3$ in the base material is in a range between about 17 and 22 wt. %.

According to the above optical fiber for preserving plane of polarization, since the average concentration of $B_2O_3$ in the base material of the stress imparting part is in a range between about 17 and 21 wt. %, and the maximum concentration of $B_2O_3$ in the base material is in a range between about 17 and 22 wt. %, the stress imparting part is not degraded even under wet heat conditions. Accordingly, the optical fiber has excellent polarization plane preserving properties, and hence, its polarization crosstalk value is not lowered. Also, cracks are not generated in the optical fiber due to the difference in the thermal expansion coefficient of the interface between the stress imparting part and the cladding.

BRIEF DESCRIPTION OF THE DRAWING

Some of the features and advantages of the invention having been described, and others will become apparent from the detailed description which follows, and from the accompanying drawing, in which.

DESCRIPTION OF THE PREFERRED EMBODIMENTS

Figure 1:
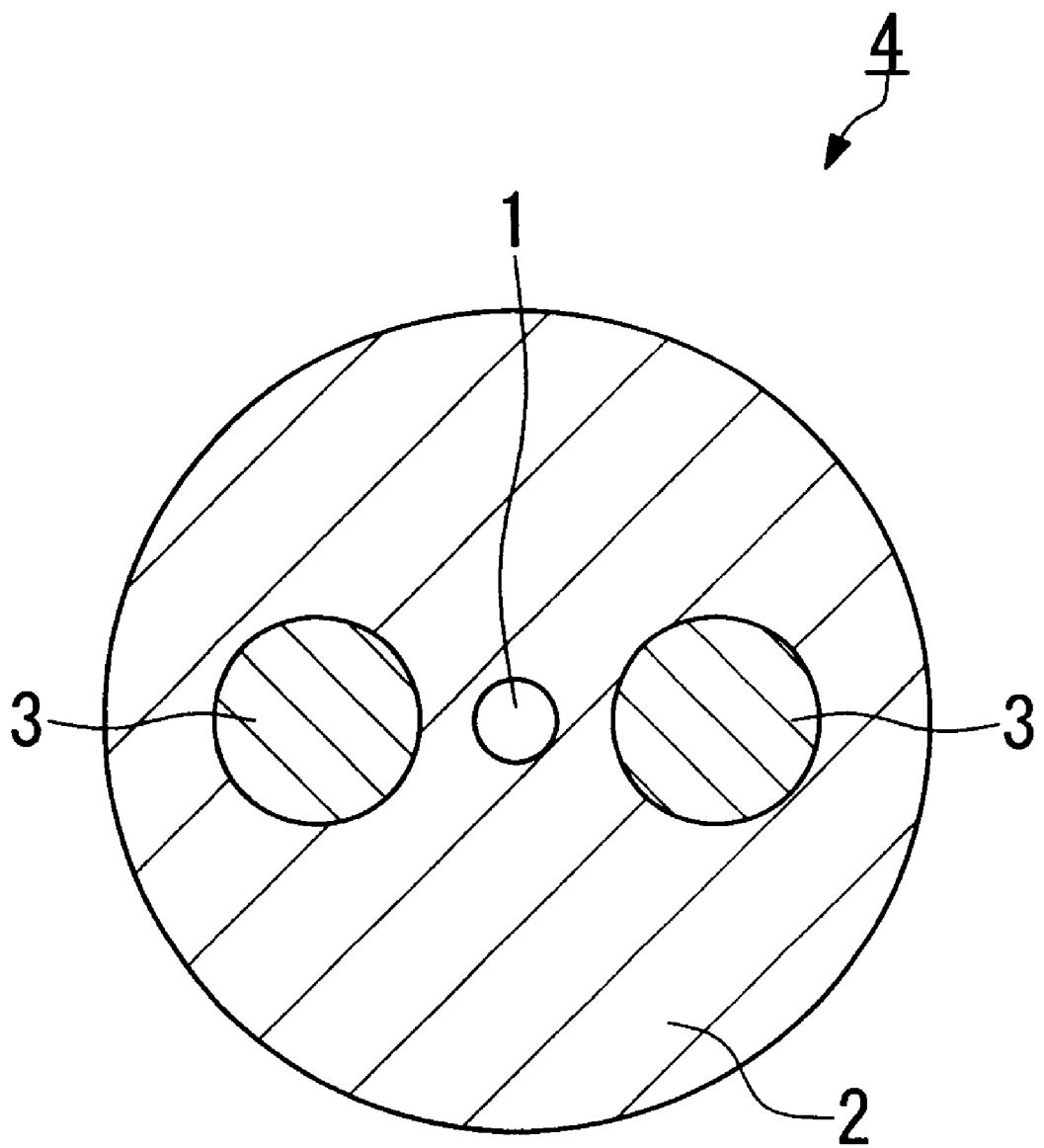
FIG. 1 is a diagram showing a cross-sectional view of a PANDA type optical fiber for preserving plane of polarization.

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples of the invention.

The polarization plane preserving optical fiber according to an embodiment of the present invention has a structure which is substantially the same as that of a conventional polarization plane preserving optical fiber shown in FIG. 1. Accordingly, hereinafter explanation of the present invention will be made using the PANDA type structure shown in FIG. 1 as an example. Also, the same numerals shown in FIG. 1 are used for purposes of explanation. The stress imparting parts 3 may be made of a glass including $B_2O_3$, and according to the embodiment of the present invention, the average concentration of $B_2O_3$ at the stress imparting part 3 is in a range between about 17 and 21 wt. % and the maximum concentration of $B_2O_3$ is in a range between about 17 and 22 wt. %. In this specification, the terms "average concentration" and "maximum concentration" mean an average concentration and a maximum concentration, respectively, at a cross section of a base material of the stress imparting part which is orthogonal to a base material of the optical fiber.

If the average concentration of $B_2O_3$ in the base material of the stress imparting part 3 is less than 17 wt. %, sufficient stress cannot be applied to the core 1 and the plane of polarization is not preserved. Also, if the average concentration of $B_2O_3$ exceeds 21 wt. %, the stress imparting part 3 is degraded due to the deliquescence of $B_2O_3$, and it becomes difficult to preserve the plane of polarization. Moreover, if the maximum concentration of $B_2O_3$ in the base material of the stress imparting part 3 is less than 17 wt. %, sufficient stress cannot be applied to the core 1 and the plane of polarization is not preserved. Further, if the maximum concentration of $B_2O_3$ exceeds 22 wt. %, the stress imparting part 3 is degraded due to the deliquescence of $B_2O_3$, and it becomes difficult to preserve the plane of polarization.

According to the embodiment of the present invention, the base material of the stress imparting part 3 of a rod shape having the concentrations of $B_2O_3$ mentioned above is inserted into two holes formed at predetermined positions of a glass base material for cladding, and is then withdrawn while being heated to produce a polarization plane preserving optical fiber.

According to the embodiment of the present invention, it is not necessary that the concentration of $B_2O_3$ be the highest at the center of the stress imparting part 3. Also, it is not necessary that the concentration of $B_2O_3$ at the periphery portion of the stress imparting part 3 be lower than that in the central portion thereof. That is, it is not necessary to create a concentration distribution in the stress imparting part 3. For this reason, the base material for the stress imparting part 3 may be easily produced.

Note that although the polarization plane preserving optical fiber 4 shown in FIG. 1 is a PANDA type polarization type, as long as the optical fiber has the stress imparting part 3.

EXAMPLES 1–5

A base material for the stress imparting part 3 including a $B_2O_3$ component shown in Table 1 was inserted in two holes formed at predetermined positions of a glass base material for the cladding 2, and was withdrawn to produce a polarization plane preserving optical fiber of Examples 1–5 and Comparative Examples 1–5.

In Examples 1–5, the average concentration of $B_2O_3$ in the base material for the stress imparting part 3 was in a range between about 17 and 21 wt. % and the maximum concentration of $B_2O_3$ was in a range between about 17 and 22 wt. %. On the other hand, in Comparative Examples 1–5, the maximum concentration of $B_2O_3$ in the base material for the stress imparting part 3 exceeded 22 wt. %.

The polarization crosstalk values of these polarization plane preserving optical fibers were measured in order to evaluate the double refractive properties thereof. The polarization crosstalk value means an output ratio from an X polarization when the X polarization is input into the optical fiber and is passed through 100 m of the fiber. In practice, the end portion of each of the optical fibers in Examples 1–5 and Comparative Examples 1–5 was polished and a connector was attached to measure the crosstalk value thereof.

It is noted that no cracks were generated at the interface between the outer periphery portion of the stress imparting part 3 and the cladding 2 in both Examples 1–5 and Comparative Examples 1–5 after the connector was attached to the fiber.

A part of the optical fibers of Examples 1–5 and Comparative Examples 1–5 was cut out and was left for 200 hours in an environmental testing device set at a temperature of 80° C. and a relative humidity of 95%. After this, the parts of the optical fibers were removed from the environmental testing device, and the cross section of the end portion of each of the optical fibers was measured using a surface roughness meter in order to examine the degree of degradation. A total of ten samples for each optical fiber were measured and the average value thereof was calculated and the results are shown in Table 1 below.

TABLE 1

| | $B_2O_3$ conc. of base material of stress impart part (wt %) | | | Polarization crosstalk value (dB/100 m) | | Mean degrad. ($\mu$m) |
|---|---|---|---|---|---|---|
| | Mean | Max. | Periphery | Before attachment of connector | After attachment of connector | |
| Ex.1 | 20.0 | 20.0 | 20.0 | −32.4 | −32.2 | 0 |
| Ex.2 | 17.3 | 19.8 | 17.3 | −33.2 | −32.7 | 0 |
| Ex.3 | 19.8 | 20.2 | 18.2 | −31.8 | −31.6 | 0 |
| Ex.4 | 18.5 | 21.0 | 17.3 | −32.6 | −32.6 | 0 |
| Ex.5 | 20.5 | 22.0 | 18.1 | −32.2 | −32.1 | 0 |
| C.Ex1 | 19.3 | 23.5 | 14.8 | −31.5 | −31.3 | 4 |
| C.Ex2 | 19.8 | 24.8 | 13.3 | −32.3 | −31.2 | 11 |
| C.Ex3 | 20.1 | 26.7 | 14.6 | −31.5 | −30.7 | 20 |
| C.Ex4 | 20.6 | 28.3 | 14.3 | −32.4 | −30.9 | 22 |
| C.Ex5 | 20.8 | 28.7 | 13.2 | −32.2 | −31.0 | 24 |

*Mean degrad. ($\mu$m) = mean of degradation amount ($\mu$m) after the wet heat test.

plane preserving optical fiber, the application of the present invention is not limited to the PANDA type and may be applied to any type of the polarization plane preserving optical fiber, such as the bow tie type and the oval jacket As shown in the Table 1, no difference in the polarization crosstalk values was observed between Examples 1–5 and Comparative Examples 1–5 before the attachment of the connectors. However, although the polarization crosstalk values were not varied after the attachment of connectors and no change was observed in the polarization plane preserving property for Examples 1–5, the polarization plane preserving property of optical fibers in Comparative Examples 1–5 was lowered after the attachment of the connectors.

Also, the stress imparting part 3 of the optical fibers in Comparative Examples 1–5, in which the maximum value of the concentration of $B_2O_3$ in the base material for the stress imparting part 3 exceeded 22 wt. %, were all degraded after the wet heat test. The degradation amount was basically proportional to the maximum value of the concentration of $B_2O_3$. On the other hand, the stress imparting part 3 of the optical fibers in Examples 1–5 were not degraded at all.

In addition, although the concentration of $B_2O_3$ in the peripheral portion of the base material for the stress imparting part 3 in Examples 1–5 exceeded 15 wt. %, no cracks were generated in the fibers.

According to the optical fiber for preserving the plane of polarization of the present invention, since the average concentration of $B_2O_3$ in the base material of the stress imparting part is in a range between about 17 and 21 wt. %, and the maximum concentration of $B_2O_3$ in the base material is in a range between about 17 and 22 wt. %, the stress imparting part of the optical fiber is not degraded even under wet heat conditions. Accordingly, the optical fiber has an excellent polarization plane preserving property, and hence, its polarization crosstalk value is not lowered. Also, cracks are not generated in the optical fiber due to the difference in the thermal expansion coefficient of the interface between the stress imparting part and the cladding.

Having thus described several exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the invention is limited and defined only by the following claims and equivalents thereto.

What is claimed is:

1. An optical fiber for preserving a plane of polarization, comprising:

a cladding; and a stress imparting part disposed in said cladding, said stress imparting part comprising a base material comprising $B_2O_3$, wherein the average concentration of $B_2O_3$ in the base material of the entire stress imparting part is in a range between about 17 and 21 wt. %, and the maximum concentration of $B_2O_3$ in the base material of the entire stress imparting part is in a range between about 17 and 22 wt. %.

2. An optical fiber for preserving a plane of polarization, comprising:

a cladding; and a stress imparting part disposed in said cladding, said stress imparting part comprising a base material extending along substantially an entire length of the optical fiber and comprising $B_2O_3$, wherein the average concentration of $B_2O_3$ in the base material is in a range between about 17 and 21 wt. %, and the maximum concentration of $B_2O_3$ in the base material is in a range between about 17 and 22 wt. %.

* * * * *